J. A. Heyl.

Horse-Shoe.

N° 87,565. Patented Mar. 9, 1869.

Witnesses:
S. N. Piper
J. R. Snow

John A. Heyl.
by his attorney
R. H. Eddy

United States Patent Office.

JOHN A. HEYL, OF BOSTON, MASSACHUSETTS, ASSIGNOR TO HIMSELF AND JOHN H. WIGGINS, OF SAME PLACE.

Letters Patent No. 87,565, dated March 9, 1869.

IMPROVEMENT IN HORSE-SHOES.

The Schedule referred to in these Letters Patent and making part of the same.

*To all persons to whom these presents may come:*

Be it known that I, JOHN A. HEYL, of Boston, of the county of Suffolk, and State of Massachusetts, have invented a new and useful Improvement in Horse-Shoes; and do hereby declare the same to be fully described in the following specification, and represented in the accompanying drawings, of which—

Figure 3:
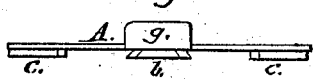

Figure 3, a front view, and

Figure 4:
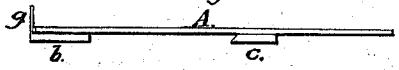

Figure 4, a side elevation of the retainer.

Figure 5:
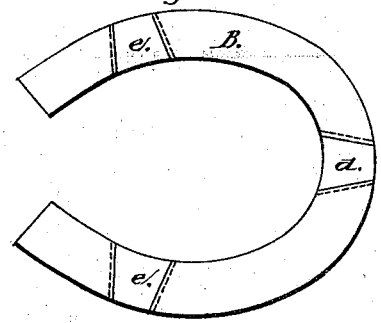

Figure 5 is a top view of the shoe.

Figure 6:
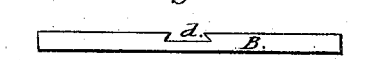

Figure 6 is a front view, and

Figure 7:
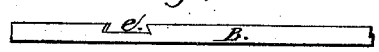

Figure 7 is a side elevation of it.

Figure 8:

Figure 8 is a top view, and

Figure 9:

Figure 9, an end view of one of the dovetailed keys employed for keeping the shoe in connection with its retainer.

Figure 1:
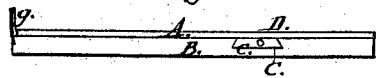
Figure 1 is a side elevation of a horse-shoe and its retainer as provided with my invention.
Figure 10:
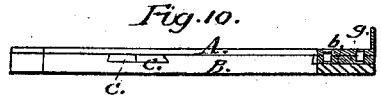
Figure 2:
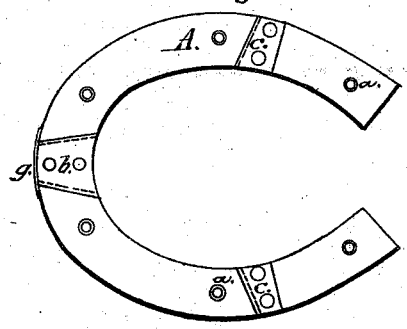
Figure 2 is an under-side view.

Figure 10 is a vertical and longitudinal section of horse-shoe and its retainer.

The said retainer, which is shown at A, in the drawings, is a thin plate, or strip of metal, bent or made in the usual form of a horse-shoe.

It is to be fastened to the hoof of a horse by screws, going through a series of holes, *a a*, &c., made through such retainer, the said screws being screwed into the hoof. Or, instead of such screws, the retainer may be secured to the hoof in any other proper manner.

The retainer, at its toe, is provided with a dovetailed tenon, *b*, which is made tapering, both transversely and longitudinally, and extends from the retainer in manner as represented.

Furthermore, there is fixed to the retainer, on its flanks, and so as to project from its lower surface, two semi-dovetailed tenons, *c c*, each of which is in the form of a right-angular trapezoid, and is bevelled on the edge which is next to the tenon *b*, the opposite edge being without any bevel, but square to the flat surface of the retainer.

There is in the shoe B, a dovetailed socket, *d*, corresponding in shape with and for receiving the tenon, *b*, of the retainer.

Furthermore, there are also in the flanks of the shoe, two other such sockets, *e e*, the whole being as shown in the drawings.

After having applied the shoe to the retainer, so as to cause the dovetailed tenon and semi-tenons of the latter to enter the dovetailed sockets of the former, there is to be forced into each of the flank-sockets a dovetailed key, C, which fills the space left in such socket, and crowds the dovetailed tenons into their sockets, so as to weld the shoe in firm connection with the retainer.

Each of the keys C is to be maintained in place in the socket by means of a screw, D, screwed into the key at its lesser end, and extended into the next adjacent semi-dovetail tenon, the recess for receiving the head of the screw being formed partly in the tenon.

The retainer I usually form with a toe-projection, *g*, to extend up from it, and against the toe of a hoof, when the retainer is fastened thereto.

The object of the retainer and its shoe-connections is to enable the shoe to be readily removed from the hoof, without the necessity of first detaching therefrom the fastenings which may go into the hoof, as the retainer, when once fixed to a hoof, need not be removed therefrom as often as it may be necessary to renew or remove the shoe.

I make no claim to the employment of a retainer to be fastened to the hoof, and to support a shoe, when connected with such retainer.

Such a retainer is shown in the patent, No. 62,076, dated February 12, 1867, and granted to George Sewell. In the shoe of Sewell, the dovetail connections are all arranged lengthwise of the shoe, and spurs and keys are employed to keep them in engagement. But in my shoe, the dovetail connections on the flanks are arranged transversely thereof, that of the toe being disposed lengthwise of the shoe.

Furthermore, I do not employ "spurs and keys," separate from the dovetails, to hold the parts in connection, and arranged as in the shoe of Sewell, as I employ semi-dovetail tenons, and separate keys, to complete the side tenons, and I also connect each of the said semi-tenons to its movable key, or fellow, by a screw.

The screws have advantages over the keys, as employed by Sewell, as the latter have to be driven into place, and are very liable to work loose and be lost; and moreover, when driven into place, cannot be easily extracted.

The driving of the keys is also liable to cause rupture of the spurs from the part from which they project, but the screws, arranged as shown in the accompanying drawings, can easily be withdrawn, and when once set up, are not easily loosened by the ordinary use of the shoe.

Furthermore, the arrangement of my flank dovetails, viz, so as to extend transversely across the flanks, is more favorable to preserving the connection of the parts intact, as the flank dovetails resist, crosswise, the back longitudinal strains of the shoe, whereas, in Sewell's shoe, such back strain is extended lengthwise of the dovetails, and is counteracted by the keys and spurs only. In my shoe, the flank dovetail connections aid in resisting the strain tending to separate the main and supplementary parts of the shoe.

Therefore, I make no claim to the employment of dovetail connections, keys, and spurs with the main and supplementary parts of the shoe, as shown in the said Sewell's patent.

Nor do I herein claim the shoe-fastening device or devices shown in Letters Patent, No. 80,074, and invented by me, as the retainer used with my present invention is applied and fixed directly to the sole of a hoof, and not made so as to grasp or embrace the hoof on its opposite sides, as is the case with the connector shown in such patent.

What I claim as my invention, is—

The arrangement of the flank dovetail connections, so as to run transversely across the flanks of the shoe, in combination with the arrangement of the keys within the dovetail sockets, and so as to complete the flank dovetail tenons, as set forth.

I also claim the combination and arrangement of the holding-screws with the dovetail keys, and sockets, and semi-tenons, arranged in or with the main and supporting parts A B of the shoe, in manner as set forth.

JOHN A. HEYL.

Witnesses:
R. H. EDDY,
F. P. HALE, Jr.